US009854327B2

(12) United States Patent
Emans et al.

(10) Patent No.: US 9,854,327 B2
(45) Date of Patent: Dec. 26, 2017

(54) METHODS AND SYSTEMS FOR PERFORMING NON-LINEAR REACH OPTIMIZATION BY COMPUTING REACH VALUES

(71) Applicant: Rovi Guides, Inc., San Carlos, CA (US)

(72) Inventors: Matthew Emans, Boston, MA (US); Steven D. Bennett, Somerville, MA (US); Samuel M. Meyer, Boston, MA (US); Randall Kelley, Belmont, MA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 15/162,950

(22) Filed: May 24, 2016

(65) Prior Publication Data
US 2017/0347160 A1   Nov. 30, 2017

(51) Int. Cl.
| | |
|---|---|
| *H04N 21/81* | (2011.01) |
| *H04N 21/466* | (2011.01) |
| *H04N 21/2668* | (2011.01) |
| *H04N 21/258* | (2011.01) |
| *H04N 21/845* | (2011.01) |
| *H04N 21/442* | (2011.01) |
| *G06Q 30/02* | (2012.01) |

(52) U.S. Cl.
CPC ....... *H04N 21/812* (2013.01); *G06Q 30/0254* (2013.01); *G06Q 30/0269* (2013.01); *H04N 21/25883* (2013.01); *H04N 21/25891* (2013.01); *H04N 21/2668* (2013.01); *H04N 21/44213* (2013.01); *H04N 21/4662* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 7,136,871 | B2 * | 11/2006 | Ozer | G06Q 30/02 |
| 7,949,565 | B1 * | 5/2011 | Eldering | G06Q 30/02 |
| | | | | 705/14.49 |
| 8,782,683 | B2 * | 7/2014 | Balakrishnan ... | H04N 21/44222 |
| | | | | 705/14.4 |
| 2014/0082660 | A1 * | 3/2014 | Zhang | H04N 21/258 |
| | | | | 725/32 |
| 2014/0289017 | A1 * | 9/2014 | Trenkle | G06Q 10/067 |
| | | | | 705/7.33 |

(Continued)

*Primary Examiner* — Hoang-Vu A Nguyen-Ba
(74) *Attorney, Agent, or Firm* — Haley Guiliano LLP

(57) ABSTRACT

Methods and systems for performing non-linear optimization of reach are described herein. The methods and systems may be used to compute the reach associated with different advertisement campaigns involving different combinations of spots. The method includes computing probabilities that a user will access a certain spot. The method includes retrieving a weight associated with the targeted user demographic. The method includes computing a first reach value using a first non-linear function, and a second reach value using a second non-linear function. The method includes comparing the two reach values to each other and to a predetermined reach threshold. The higher reach value larger than the predetermined reach threshold is selected and information associated with the selected reach value is provided to the user.

18 Claims, 9 Drawing Sheets

(56) References Cited

U.S. PATENT DOCUMENTS

2015/0037013 A1* 2/2015 Thomas ............... G11B 27/105
386/343
2015/0186932 A1* 7/2015 Xu ..................... G06Q 30/0269
705/14.66

* cited by examiner

1000

Your Optimized Reach = 72%   1002

Your Slots:

① American Idol   1004
    Tuesday, 8:00 PM

② The Voice 1006
    Friday, Saturday 10:00 PM

FIG. 10

METHODS AND SYSTEMS FOR PERFORMING NON-LINEAR REACH OPTIMIZATION BY COMPUTING REACH VALUES

BACKGROUND

Reach values are a metric used to describe how many unique people an advertisement or a media asset reached. Reach values are often important in determining where advertisements should be placed to have the maximum impact by reaching the largest possible audience. Traditional reach optimization systems use simplistic linear models of reach to provide data to users. Often, this data is not accurate or precise, and does not enable users to make good decisions about where advertisements should be placed.

SUMMARY

Methods and systems for performing non-linear reach optimization are described in this disclosure. In some embodiments, a method includes retrieving, from a media content database, a plurality of available spots. For example, the optimization system may retrieve the following spots: {(Channel 8, 5:57 pm), (Channel 11, 2:31 pm)}. In some embodiments, the method includes computing a plurality of probabilities associated with a user, wherein each probability of the plurality of probabilities is associated with one of the plurality of available spots. For example, the optimization system may compute probabilities {0.45, 0.67} for the retrieved available spots {(Channel 8, 5:57 pm), (Channel 11, 2:31 pm)}. These probabilities may describe the likelihood of a targeted user accessing the spot.

In some embodiments, the method includes determining a plurality of values, wherein each value in the plurality of values is associated with a probability in the plurality of probabilities. The optimization system may determine a set of values n, wherein each value corresponds to a probability. Each value in the set of values may describe a factor used in the non-linear computation to create the non-linear function.

In some embodiments, the method includes identifying a characteristic associated with the user. For example, the optimization system may determine that one characteristic of the targeted user is "earns less than $40,000." In some embodiments, the method includes retrieving, from a demographics database, a weight associated with the characteristic associated with the user. For example, the optimization system may retrieve the weight 0.3 with the characteristic "earns less than $40,000." The weight may represent a ratio of people with the characteristic to the total number of people in the targeted audience.

In some embodiments, the method includes computing a first reach value associated with the user based on the plurality of probabilities, the plurality of values, and the weight. For example, the optimization system may compute a first reach value of 0.60.

In some embodiments, the method includes modifying a subset of the plurality of values to create a modified plurality of values. The optimization system may modify the values of n to calculate the first reach value by selecting a new set of values. In some embodiments, the optimization system may edit a predetermined number of the current set of values instead of selecting a new set of values. In some embodiments, the method includes computing a second reach value associated with the user based on the plurality of probabilities, the modified plurality of values, and the weight. For example, the optimization system may determine that the second reach value is 0.55.

In some embodiments, the method includes comparing the first reach value and the second reach value to determine that the first reach value is greater than the second reach value. For example, the optimization system may compare the first reach value of 0.60 and the second reach value of 0.55 to determine that the first reach value is greater than the second reach value. In response to this determination, the optimization system may discard the second reach value by removing it from storage or storing it in a different location than the first reach value.

In some embodiments, the method includes comparing the first reach value to a predetermined reach threshold. The optimization system may use a predetermined reach threshold, and compare it to the first reach value. In some embodiments, the method includes, in response to determining that the first reach value is above the predetermined reach threshold, transmitting the plurality of probabilities, the plurality of available spots, and the plurality of values to a user equipment device. The user equipment device may process and sort this data to generate for display the information.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which:

FIG. 10 shows an exemplary output screen for displaying results of the optimization system to a user of the optimization system, in accordance with some embodiments of the disclosure.

DETAILED DESCRIPTION

Methods and systems for performing non-linear optimization of reach are described herein. The methods and systems may be used to compute the reach associated with different advertisement campaigns involving different combinations of spots. The method includes computing probabilities that a user will access a certain spot. The method includes retrieving a weight associated with the targeted user demographic. The method includes computing a first reach value using a first non-linear function, and a second reach value using a second non-linear function. The method includes comparing the two reach values to each other and to a predetermined reach threshold. The higher reach value larger than the predetermined reach threshold is selected and information associated with the selected reach value is provided to the user.

Figure 1:
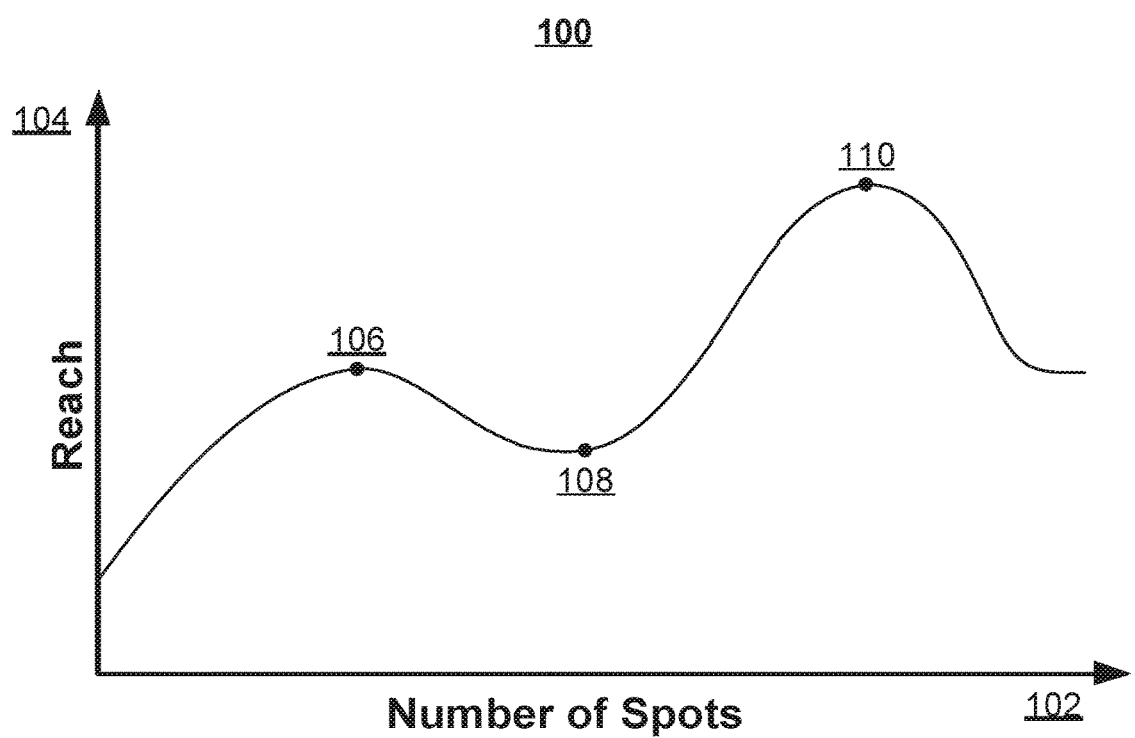
FIG. 1 shows an illustrative reach graph, in accordance with some embodiments of this disclosure.

FIG. 1 shows an illustrative reach graph 100, incorporating embodiments of the present disclosure. Reach graph 100 is exemplary, and reach graphs can show any relationship between the number of spots and reach. For example, quadratic, cubic, hyperbolic, or parabolic relationships could be shown by reach graph 100. An optimization system may create several reach graphs using control circuitry 404 and store several reach graphs using 408. The optimization system may create the reach graphs by using process 900. All reach values determined in process 900 may be stored and plotted using reach graph 100. Each different reach graph may correspond to a different media source, user demographic, time, type of user device, and so on.

Axis 102 on reach graph 100 indicates a number of spots. Each spot is a unit of time. For example, each spot may be thirty seconds long. Spots may be measured in any unit of time, such as seconds, minutes, and hours. In a non-limiting example, each spot may be an advertisement spot, during which an advertisement can be placed to be shown to viewers. In some embodiments, each spot may represent a physical space. For example, each spot may represent any of billboards, newspaper advertisement spaces, and cell phone advertisement banner locations. In some embodiments, axis 102 may represent different combinations of spots. For example, a first combination of "Show A" and "Show B" and a second combination of "Show C" and "Show D" may both be included on axis 102 even though both combinations have the same number of spots.

Axis 104 on reach graph 100 indicates a reach value. As referred to herein, the reach value represents a fraction of a population that has viewed, heard, or otherwise been exposed to a spot. In some embodiments, the reach value may be a "reach n-plus" value and represent a fraction of a population that has been exposed to a spot "n" times. Reach values measure the unique users who have been exposed to a spot. For example, an audience member who has been exposed to a spot five times will cause the same shift in a reach value as an audience member who has been exposed to the spot only once. In some embodiments, axis 104 may represent the reach in a certain population and not the reach in the general population. For example, axis 104 may represent the reach among males earning less $40,000 per year.

The value of reach graph 100 for different values of axis 102 (number of spots) and axis 104 (reach) represents the number of unique players that will be reached by the given number and/or combination of spots. Point 106 on reach graph 100 shows a local maximum value of reach graph 100. Point 108 shows a local minimum value. Point 110 shows a global maximum value. A user may be interested in determining the global maximum value of reach to help the user choose which spots to place advertisements in. The user may decide not to buy more spots than the number of spots associated with point 110, since the additional spots will not increase reach. The user may also decide to place advertisements in spots associated with point 110 to achieve the largest reach possible.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
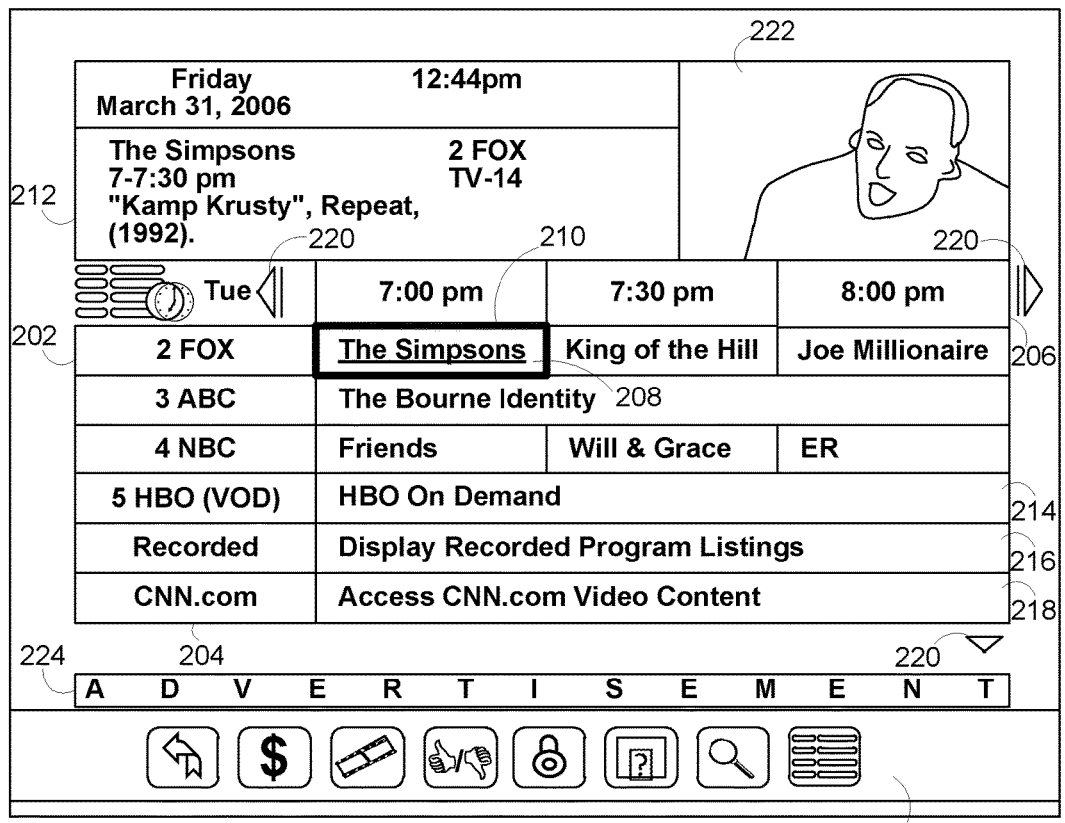
FIG. 2 shows an illustrative example of a display screen generated by a media guidance application, in accordance with some embodiments of the disclosure.
Figure 3:
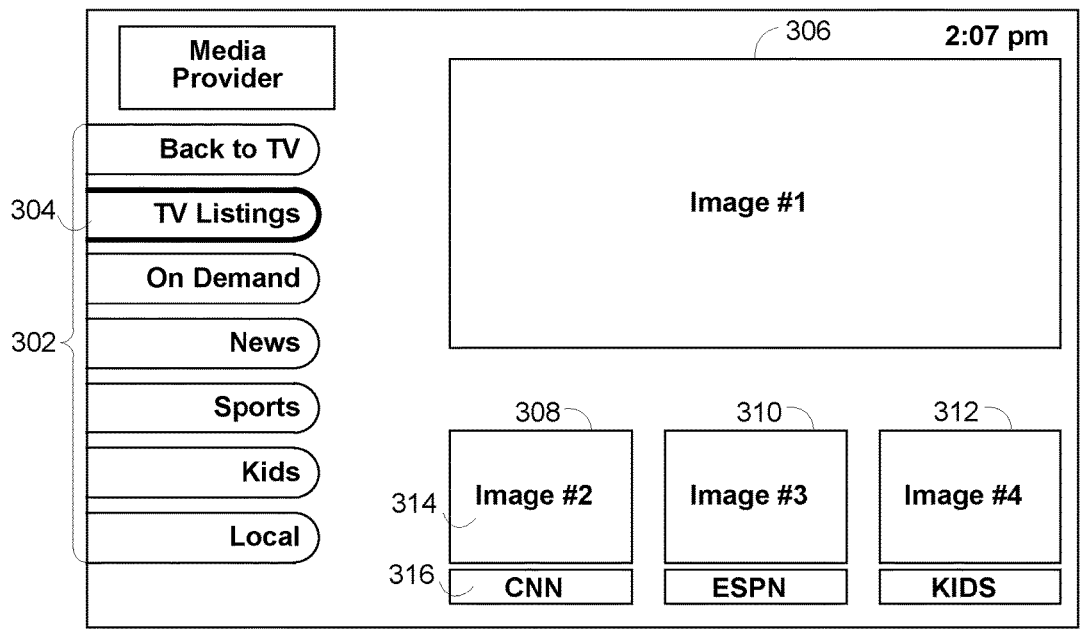
FIG. 3 shows another illustrative example of a display screen generated by a media guidance application, in accordance with some embodiments of the disclosure.

FIGS. 2-3 show illustrative display screens that may be used to provide media guidance data. The display screens shown in FIGS. 2-3 may include several advertisement spots with varying reach values. The optimization system may compute the reach associated with these various advertisement spots. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

Advertisement 224 may be placed by a user of the optimization system using the information provided by the optimization system. The optimization system may use advertisement 224 as a spot and analyze the reach associated with this spot.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
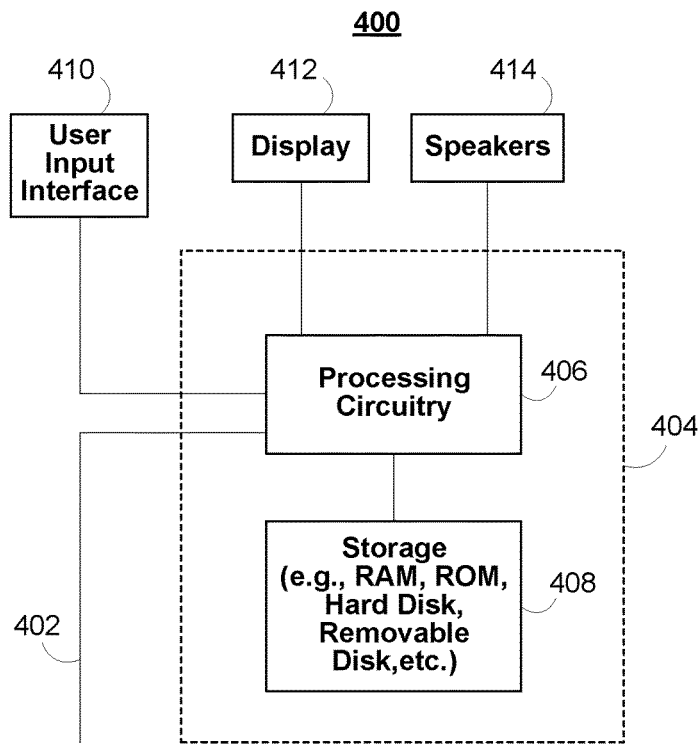
FIG. 4 is a block diagram of an illustrative user equipment device, in accordance with some embodiments of the disclosure.

Users may access content and the media guidance application (and its display screens described above and below) from one or more of their user equipment devices. The optimization system may also be executed on a user equipment device. In some embodiments, the optimization system may be executed in a distributed manner on many user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
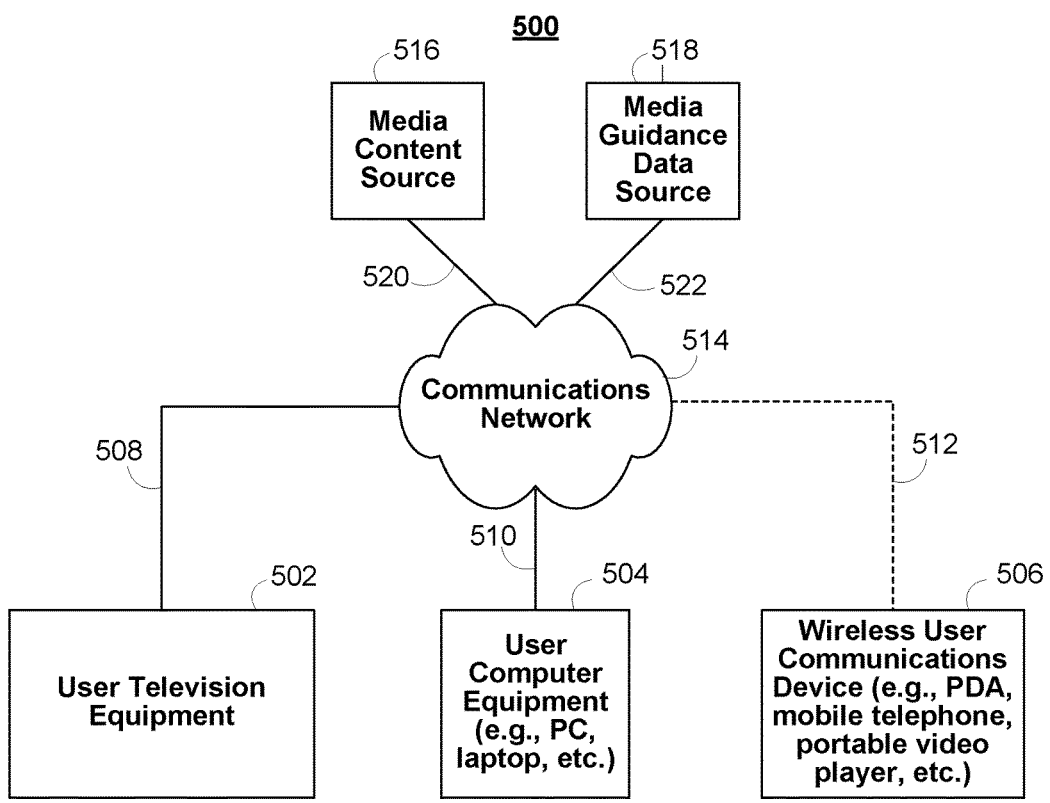
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
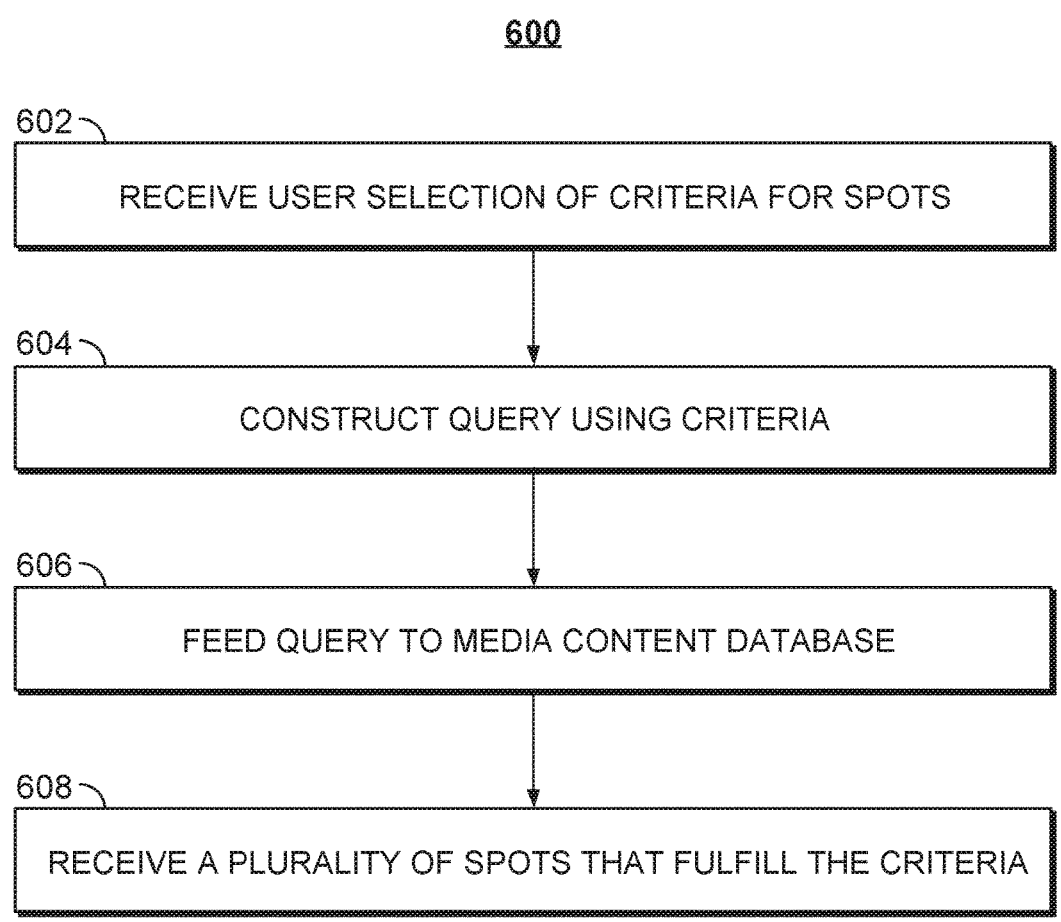
FIG. 6 shows an exemplary process for retrieving, from a media content database, a plurality of available spots, in accordance with some embodiments of the disclosure.

FIG. 6 shows an exemplary process 600 for retrieving, from a media content database, a plurality of available spots, incorporating embodiments of the present disclosure. Process 600 may be executed by control circuitry 404. The optimization system may execute process 600 to receive user criteria about which spots the user is interested in, and identify available spots that satisfy the user's criteria.

Process 600 begins at block 602, when control circuitry 404 receives a user selection of criteria for spots. The optimization system may receive the user selection through user input interface 410. In some embodiments, the user criteria may indicate which television advertisements spots should be targeted by specifying any combination of a certain channel/network, broadcast time, viewing time, targeted demographic, viewership size, parental control rating, and the like. In some embodiments, the user criteria may indicate which print advertisement spots should be targeted by specifying any combination of frequency of publication, genre, readership size, readership demographics, and the like.

Process 600 proceeds to block 604, when control circuitry 404 constructs a query using the received criteria. The optimization system may construct the query using any suitable language or syntax, such as XML. For example, the optimization system may have received user criteria stating that the user wishes to place advertisements in primetime slots aimed at women of ages 21-34. The optimization system may use this information to construct the following query: ["TIME=2000 TO 2300" && "GENDER=FEMALE" && "AGE=21 TO 34"].

Process 600 proceeds to block 606, when control circuitry 404 feeds the query to a media content database. The optimization system may use the query constructed in block 604, and transmit the query using communications network 514 to media content source 516 or media guidance data source 518. In some embodiments, if the media content database or a portion of it is locally stored or cached, the optimization system may also feed the query to local storage circuitry 408. The media content database may include a listing of all available advertisement slots and all unavailable advertisement slots. The optimization system may allow a user to place advertisements on available advertisement slots, but only join a waiting list for unavailable advertisement slots. Some or all users on the waiting list may be notified if an unavailable advertisement slot becomes available.

Process 600 proceeds to block 608, when control circuitry 404 receives a plurality of spots that fulfill the criteria. The optimization system may receive the spots from a remote server using communications network 514 or from local storage circuitry 408. For example, if the optimization system sent the query ["TIME=2000 TO 2300" && "GENDER=FEMALE" && "AGE=21 TO 34"] to a remote server, it may receive the following plurality of spots that fulfill the criteria: {(Channel 8, 2015), (Channel 8, 2016), (Channel 10, 2214), (Channel 11, 2215)}. The optimization system may receive any number of slots that fulfill the criteria.

Figure 7:
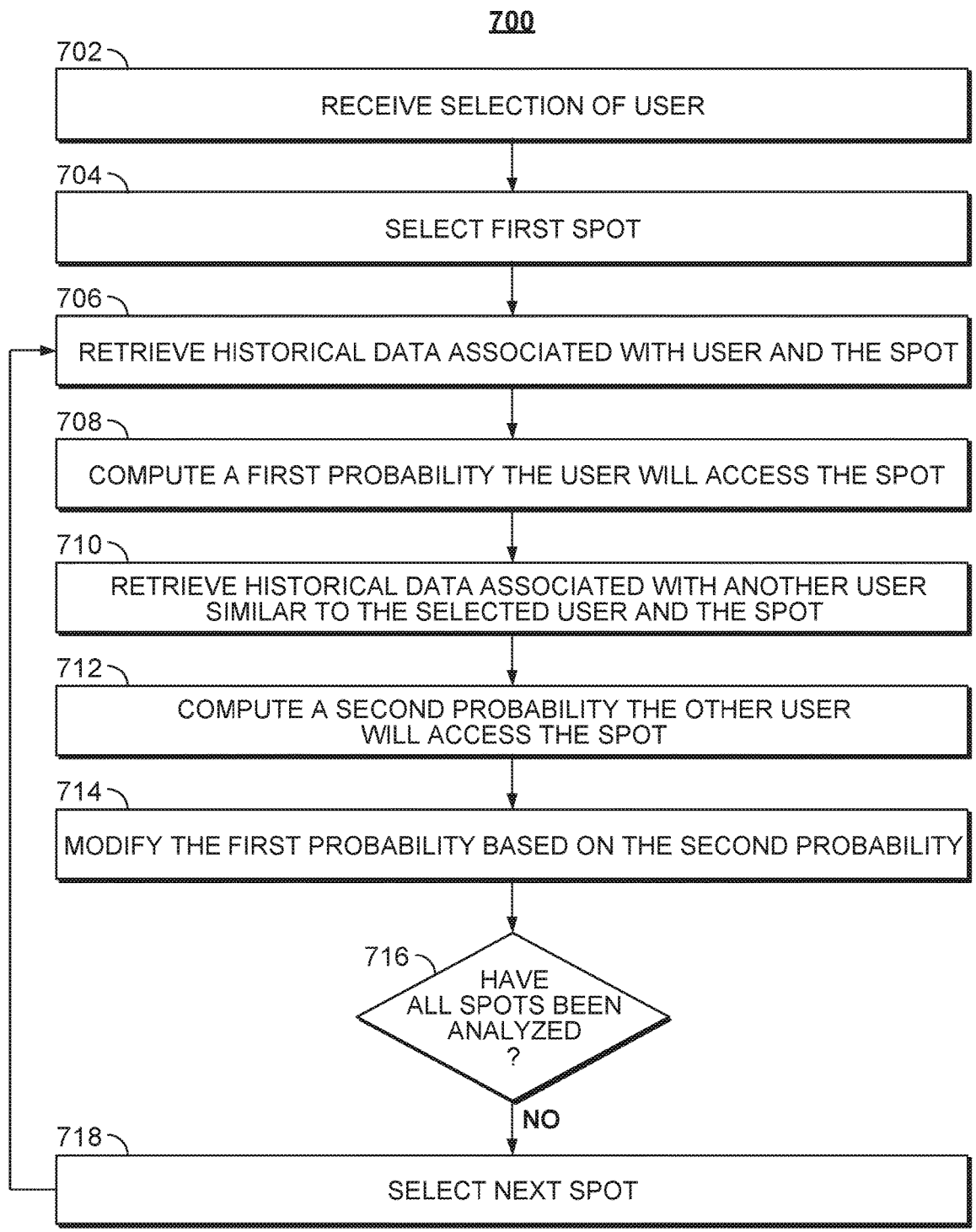
FIG. 7 shows an exemplary process for computing a plurality of probabilities associated with a user, in accordance with some embodiments of the disclosure.

FIG. 7 shows an exemplary process 700 for computing a plurality of probabilities associated with a user, incorporating embodiments of the present disclosure. The optimization system may use process 700 to form an estimate of the probability a given user will access a given spot. The optimization system may receive user input identifying the given user who should be targeted using process 700. For example, the optimization system may receive user input, from user input interface 410, identifying that the given user to be used in process 700 is a female in New York between the ages 21 and 34.

Process 700 begins at block 702, when control circuitry 404 receives a selection of a user. The optimization system may receive the selection through user input interface 410. The selected user may represent a demographic to be targeted for the advertisement slots. For example, the optimization system may receive a selection of a targeted user who is male and earns less than $40,000 per year. The optimization system may use this targeted user to compute reach among the same demographic as the targeted user. This will allow the optimization system to ensure the resulting reach value is relevant to the targeted user.

Process 700 proceeds to block 704, when control circuitry 404 selects a first spot. The first spot may be one of the spots received in block 608. The optimization system may store the received blocks in an array using storage circuitry 408. At block 704, the optimization system may select a first spot from the stored array.

Process 700 proceeds to block 706, when control circuitry 404 retrieves historical data associated with the user and the spot. The historical data may be accessed from a remote server using communications network 514, or from storage network 408. The historical data may describe the historical reach for the given spot. For example, if the targeted user is a male earning less than $40,000 and the selected spot is a 8:57 pm spot on channel 8, the historical data may describe the reach in the last five weeks of the 8:57 pm spot on channel 8 for males earning less than $40,000. In some embodiments, several values of historical data may be combined using a statistical method such as computing mean, median, or mode.

Process 700 proceeds to block 708, when control circuitry 404 computes a first probability the user will access the spot. The optimization system may compute this probability using the historical data retrieved in block 706. For example, the optimization system may receive a data table listing spots in one column and a Boolean value in another column to indicate whether the corresponding spot was accessed by the user. The optimization system may add the Boolean values to determine how many times the user accessed the spots. If the optimization system retrieves historical data indicating that the targeted user accesses an 8:57 pm spot on channel 8 four out of every five nights, the optimization system may compute that the probability is (4 nights/5 nights=) 0.8 or 80%. The optimization circuitry may perform this computation by storing the nights that the user watched the spot in one register, storing the total number of nights in another register, and dividing the two registers.

In some embodiments, the optimization system may decay the value of old historical data and more heavily weight new historical data when computing the probability. For example, if the optimization system determines the targeted user accessed the 8:57 pm spot on channel 8 on every night last week, but on no nights this week, the optimization system may weigh last week's accesses using a factor of 10%. Hence, the optimization system may determine that the spot was accessed last week with a probability of (10%*(5 nights/5 nights))=0.1. The optimization system may also determine that the spot was accessed this week with a probability of (100%*(0 nights/5 nights))=0.0. The optimization system may add the two probability values to determine that the probability is 0.1 or 10%. The optimization system may also take into account the frequency, the pattern, the existence of outliers, and the randomness of the historical accesses into account when computing the probability. In some embodiments, the weight value may be calculated using other methods such as collaborative filtering or predictive machine learning algorithms to analyze the historical data.

Process 700 proceeds to block 710, when control circuitry 404 retrieves historical data associated with another user similar to the selected user and the spot. The optimization system may retrieve this additional historical data to fine-tune its probability calculation. For example, the selected user may be a male earning less than $40,000. However, the historical data for the targeted user may be patchy or unreliable. The optimization system may retrieve more reliable data for males earning between $40,000 and $45,000 to augment the previously retrieved historical data and provide better results. The optimization system may determine whether another user is similar to the selected user based on heuristics stored using storage circuitry 408. The heuristics may be implemented as functions that take as an input two user characteristics and return a Boolean value indicating whether the two user characteristics are similar. For example, a heuristic function may state that a user is similar to another user if the difference between their earnings is less than $5,000. Another heuristic function may state that a user is similar to another user if the difference between their ages is less than ten years.

Process 700 proceeds to block 712, when control circuitry 404 computes a second probability the other user will access the spot. The optimization system may compute the second probability using the historical data retrieved in block 710. The optimization system may compute the second probability as described in relation to block 708.

Process 700 proceeds to block 714, when control circuitry 404 modifies the first probability based on the second probability. In some embodiments, the optimization system may only modify the first probability if certain conditions are satisfied, such as the historical data retrieved in block 706 was unreliable or the first and second probability differ by more than a threshold amount. The optimization system may modify the first probability by adding a weighted version of the second probability to it. For example, the optimization system may modify the first probability of 0.8 using the second probability of 0.7 by weighting the difference of the two probabilities (0.7−0.8=−0.1) by 10% (0.10*−0.1=−0.01) and then adding it to the first probability to result in a modified probability of (0.8−0.01=) 0.79. The optimization system may then store modified probability (or the first probability, if no modified probability was created) using storage circuitry 408. The optimization system may also store an association between the stored probability and the spot. For example, the optimization system may store the information in a table, where each row includes the stored probability and the associated spot. In some embodiments, the optimization system may create a data structure capable of holding at least two values indicating the probability and the spot, and then store these data structures using an array, a list, or a queue in memory.

Process 700 proceeds to block 716, when control circuitry 404 determines whether all spots retrieved in block 608 have been analyzed using blocks 706-714. If the optimization system determines all spots have been analyzed, the optimization system terminates process 700. If the optimization system determines all spots have not been analyzed, process 700 proceeds to block 718, when control circuitry 404 selects the next spot. If all spots are stored in an array data structure, the optimization system may select the next element in the array. However, it is understood that the spots may be stored in any suitable data structure such as queues, stacks, trees, and the like. Once the next spot has been selected, process 700 returns to block 706.

Figure 8:
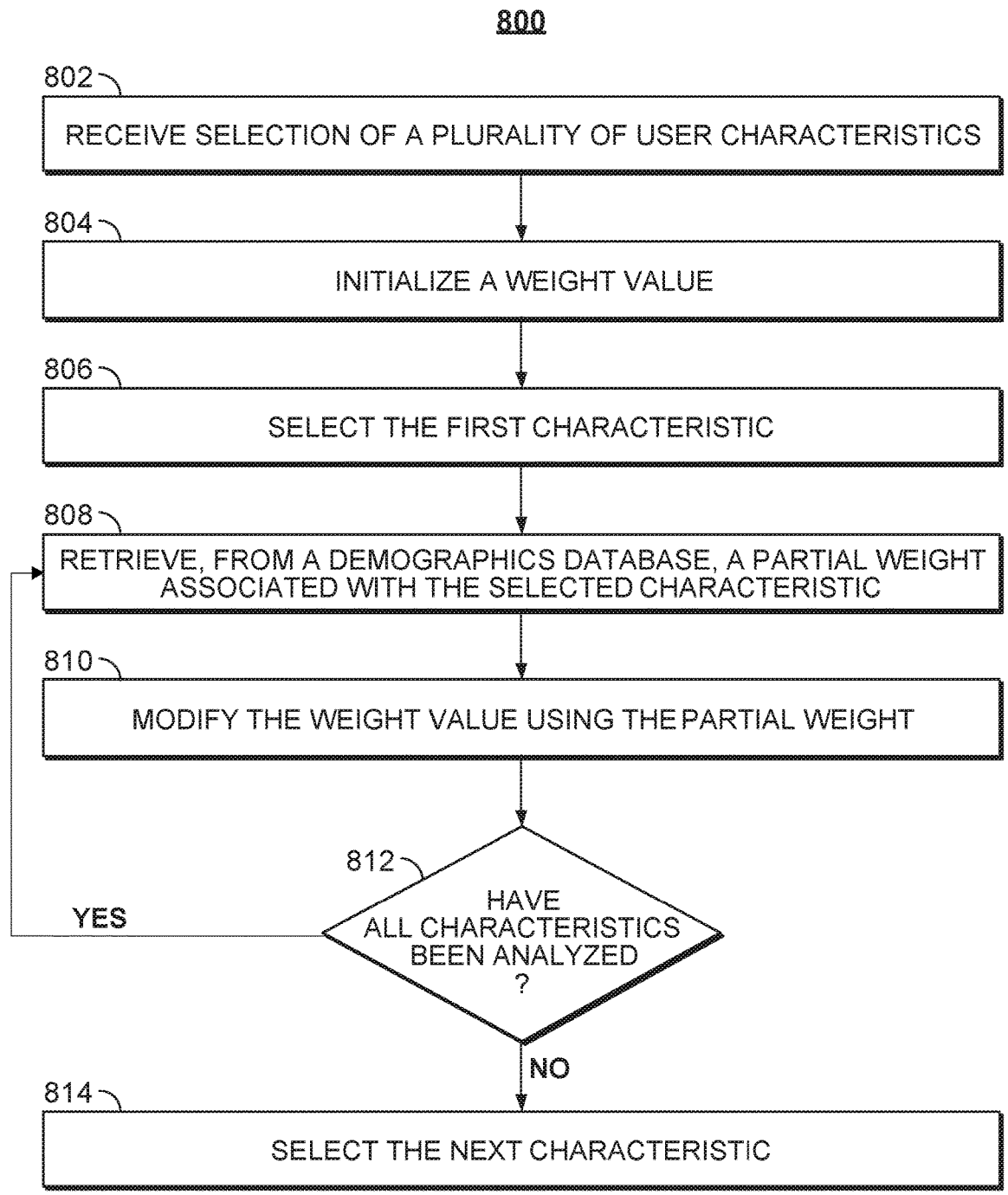
FIG. 8 shows an illustrative process for computing a weight associated with a user, in accordance with some embodiments of the disclosure.

FIG. 8 shows an illustrative process 800 for computing a weight associated with a user, incorporating embodiments of the present disclosure. The optimization system may use process 800 to determine a weight that represents all characteristics associated with the user. In some embodiments, the weight is a ratio of a number of users in the demographics database associated with the characteristic and a total number of users in the demographics database. The user may represent a targeted user demographic, as described in relation to block 702. For example, the targeted user may have characteristics that describe a targeted demographic of females between 18 and 21 who live in California.

Process 800 begins at block 802, when control circuitry 404 receives a selection of a plurality of user characteristics. For example, the optimization system may receive, from user input interface 410, input that indicates the targeted user's characteristics are "female," "between 18 and 21," and "California."

Process 800 proceeds to block 804, when control circuitry 404 initializes a weight value. The optimization system may initialize the weight value to a preset value stored using storage circuitry 408. For example, the optimization system may initialize the weight value to 1.

Process 800 proceeds to block 806, when control circuitry 404 selects the first characteristic. For example, if the optimization system received the characteristics "female," "between 18 and 21," and "California," the optimization system may select the first characteristic "female."

Process 800 proceeds to block 808, when control circuitry 404 retrieves, from a demographics database, a partial weight associated with the selected characteristic. The demographics database may be stored on a remote server and accessed through communications network 514, or stored locally using storage circuitry 408. The demographics database may store information indicating what percentage of the population has certain characteristics. For example, the optimization system may transmit the characteristic "female" to the demographics database and receive the partial weight 0.5. This partial weight indicates about 0.5 of the total population has the characteristic "female."

In some embodiments, the partial weight may be computed using only a subset of the general population, based on the targeted demographic. For example, the optimization system may receive user input that the characteristics of the targeted demographic are "female," "between 18 and 21," and "California." The optimization system may determine that the weight for females in the general world population is 0.5, but that the weight for females in California is 0.4. Since the targeted demographic includes the characteristic California, the optimization system may retrieve the partial weight 0.4.

Process 800 proceeds to block 810, when control circuitry 404 modifies the weight value using the partial weight. In some embodiments, the modification may comprise multiplying the initial weight value by the partial weight value. For example, if the initial weight value was 1 and the partial weight value was 0.5, the optimization system may multiply the two values to result in a modified weight value of 0.5.

Process 800 proceeds to block 812, when control circuitry 404 determines whether all characteristics received in block 802 have been analyzed using blocks 806-810. In some embodiments, the optimization system may store all characteristics as elements in an array, and test whether the last element in the array has been reached. If the optimization system determines all characteristics have been analyzed, the optimization system stores the final weight value using storage circuitry 408 and terminates process 800. If the optimization system determines all characteristics have not been analyzed, process 800 proceeds to block 814, when control circuitry 404 selects the next characteristic. Process 800 then repeats from block 808.

Figure 9:
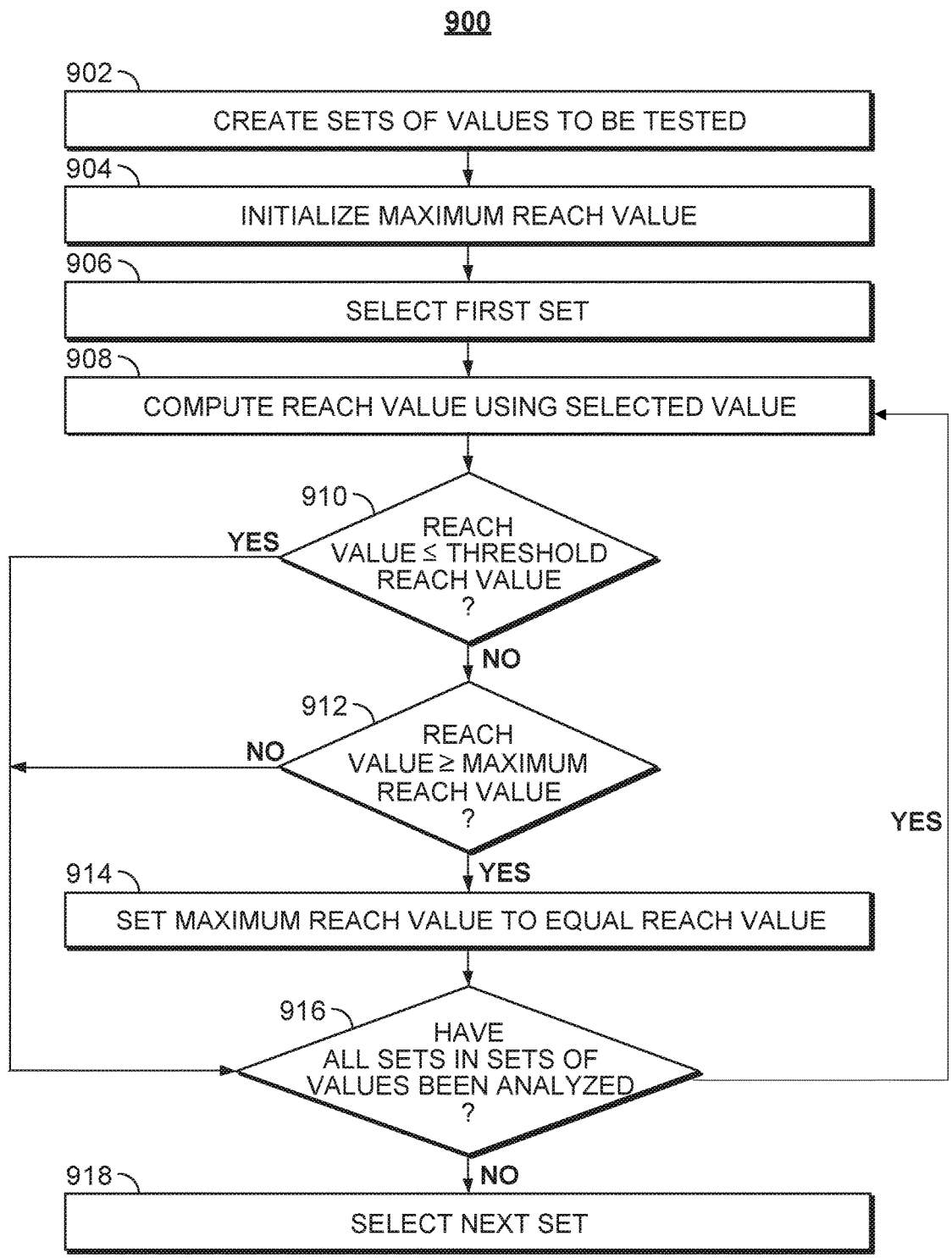
FIG. 9 shows an illustrative process for computing reach values using probability values and weight values, in accordance with some embodiments of the disclosure.

FIG. 9 shows an illustrative process 900 for computing reach values using the probability values computed using process 700 and the weight values computed using process 800, incorporating embodiments of the present disclosure. The optimization system may perform process 900 to directly calculate reach instead of estimating reach by calculating other quantities such as the number of impressions that measure non-unique accesses of a spot. The optimization system may perform process 900 several times until an optimal value of reach is calculated.

Process 900 begins at block 902, when control circuitry 404 creates sets of values to be tested. The optimization system may create these values using a random number generator and splitting the results into different sets. In some embodiments, the optimization system may create these values based on rules received from a user of the optimization system. For example, if the optimization system received a rule that no slots after 11:00 pm should be considered, then the optimization system may generate in each set values of "0" associated with slots after 11:00 pm. Other rules may include restrictions on channels that should be considered, restrictions on how many different channels should be considered, or restrictions on how many advertisements should be placed in a single media asset. The optimization system may describe each rule as a function with a Boolean output. For example, a rule function to determine whether a slot is after 11:00 pm may compare an input time to 11:00 pm and return True if the input time is greater than 11:00 pm, and False otherwise.

Process 900 proceeds to block 904, when control circuitry 404 initializes a maximum reach value. The optimization system may initialize the maximum reach value based on preset information stored using storage circuitry 408. For example, the optimization system may initialize the maximum reach value to be 0. In some embodiments, the optimization system may initialize the maximum reach value to be a non-zero number received using user input interface 410.

Process 900 proceeds to block 906, when control circuitry 404 selects the first set. The optimization system may select a first set of the sets of values generated in block 902.

Process 900 proceeds to block 908, when control circuitry 404 computes a reach value using the selected set of values. The optimization system may perform this computation using the probabilities computed in process 700. Each probability of user i accessing a spot t may be represented as:
$P_{it}$
The set of values may include a different n value for each spot t. The optimization system may perform this computation using weight values computed in process 800. Each weight value, representing how many users in a population are represented by user i, may be represented as:
$w_i$
The reach value for all users represented by the user i accessing spots from a media plan M and using values of n from the set of values is:

$$R = w_i \left[ 1 - \prod_{t \in M} (1 - p_{it})^n \right]$$

Since the values of n vary and can be any value, reach is calculated using a non-linear function. In some embodiments, the optimization system may compute the reach for multiple targeted users in a sample S at the same time:

$$R = \sum_{i \in S} w_i \left[ 1 - \prod_{t \in M} (1 - p_{it})^n \right]$$

In these equations, R is the predicted reach, which describes the number of unique users who will be exposed to the chosen spots.

The above-described reach computations may be performed in a distributed and parallelized manner, such that each product for values of M or sum for values of S is calculated separately. These calculations may be performed on a floating-point unit or another type of arithmetic logic unit.

In some embodiments, the optimization system may account for various rules when computing reach. These rules may be received from a user of the optimization system through user input interface 410. The value of n for a certain spot t may be fixed to account for the rules. If a set includes values of n that do not conform to the values required by the rules, the resulting reach value may be deleted. For example, the optimization system may receive a rule that no advertisements should be placed in spots during "Show A." To account for this, the optimization system may impose a condition that all n values associated with probabilities for "Show A" should be zero. If the optimization system computes a reach value using n values that do not conform to the rule, the resulting reach value may be deleted, and process 900 may proceed to block 916.

Process 900 proceeds to block 910, when control circuitry 404 determines whether the reach value computed in block 908 is less than or equal to a threshold reach value. The optimization system may have previously received the threshold reach value from a user of the optimization system through user input interface 410, and stored it using storage circuitry 408. For example, the optimization system may evaluate the following equation:

$$R = \sum_{i \in S} w_i \left[ 1 - \prod_{t \in M} (1 - p_{it})^n \right] \le R_0$$

wherein $R_0$ is the threshold reach value. If the optimization system determines that the reach value is less than or equal to the threshold value, process 900 proceeds to block 916. Otherwise, process 900 proceeds to block 912.

Process 900 proceeds to block 912, when control circuitry 404 determines whether the reach value is more than or equal to the maximum reach value computed in block 904 or block 914. If the optimization system determines that the reach value is more than or equal to the maximum reach value, process 900 proceeds to block 914. Otherwise, process 900 proceeds to block 916.

Process 900 proceeds to block 914, when control circuitry 404 sets the maximum reach value to equal the currently computed reach value. The optimization system may perform this block to ensure the maximum reach value is always updated to equal the highest reach value computed so far in process 900. The optimization system may store the current set of values and the modified reach value using storage circuitry 408. In some embodiments, the optimization system may log every reach value computed in a trials database to enable data analysis at a later time. The optimization system may store log information in the trials database such that each reach value is associated with the set of values n that was used to compute it.

Process 900 proceeds to block 916, when control circuitry 408 determines whether all sets in the sets of values have been analyzed. If the optimization system determines all sets have been analyzed, the optimization system terminates process 900. Otherwise, process 900 proceeds to block 918, when control circuitry 408 selects the next set of the sets. Process 900 then returns to block 908.

In some embodiments, the optimization system selects a random set of the sets instead of the next set in block 918.

In some embodiments, the optimization system selects random values of n and adds them to the selected set. This allows the optimization system to test random points across the reach graph 100 to determine the general shape of the graph. For example, the optimization system may only be able to determine local maximum point 106 using a first plurality of sets, but may be able to identify global maximum point 110 by using a randomly selected set. The optimization system may hence take advantage of computing random values to better optimize reach values on reach curve 100.

FIG. 10 shows an exemplary output screen 1000 for displaying results of the optimization system to a user of the optimization system, incorporating embodiments of the present disclosure. Output screen 1000 may be generated for display by control circuitry 404 using display 412. In some embodiments, output screen 1000 may be accompanied by sounds from speakers 414. The information shown in output screen 1000 is exemplary, and any other combination of information and results, as described in this disclosure, may be displayed without departing from the scope of this disclosure.

Output screen 1000 includes reach indicator 1002 that states an optimized reach value. This optimized reach value may be the maximum reach value computed using process 900. Output screen 1000 also includes slot identifiers 1004 and 1006. Slot identifiers 1004 and 1006 may indicate to the user which slots the user should purchase and put advertisements on to achieve the displayed reach value. In some embodiments, the optimization system may sort slot identifiers 1004 and 1006 based on their respective contributions to the overall reach value 1002, so that media assets with greater contributions are displayed before those with lesser contributions. In some embodiments, the optimization system may sort and display slot identifiers 1004 and 1006 so the more affordable slot identifiers are displayed higher on the list. The optimization system may also e-mail this information to the user or print it out for the user instead of, or in addition to, displaying output screen 1000.

Figure 11:
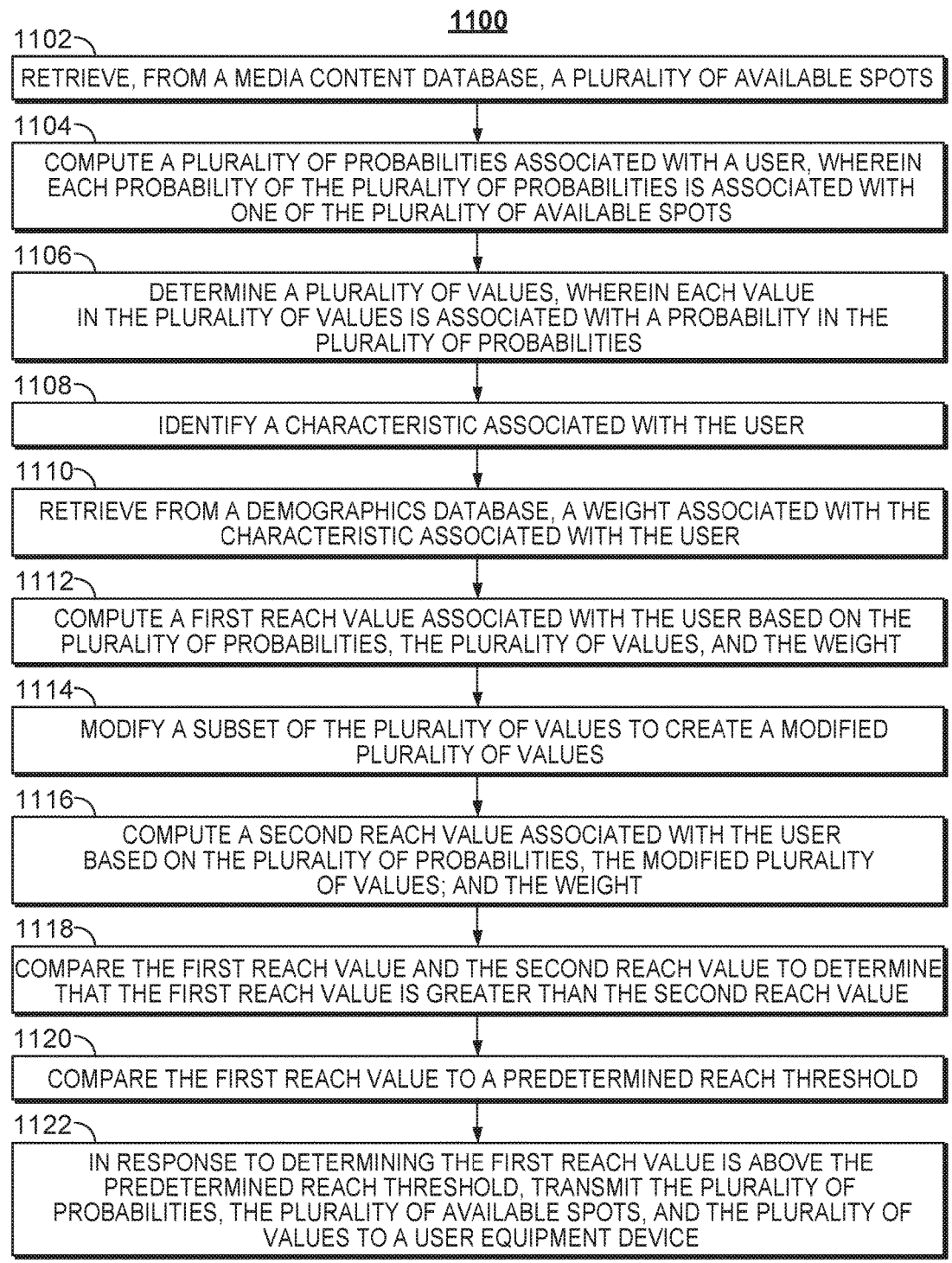
FIG. 11 shows an exemplary process for performing non-linear reach optimization, in accordance with some embodiments of the disclosure.

FIG. 11 shows an exemplary process 1100 for performing non-linear reach optimization, incorporating embodiments of the present disclosure. Process 1100 begins at block 1102, when control circuitry 404 retrieves, from a media content database, a plurality of available spots. The optimization system may perform this block as described in relation to FIG. 6. For example, the optimization system may retrieve the following spots in a data structure such as an array or a dictionary: {(Channel 8, 5:57 pm), (Channel 11, 2:31 pm)}. Process 1100 proceeds to block 1104, when control circuitry 404 computes a plurality of probabilities associated with a user, wherein each probability of the plurality of probabilities is associated with one of the plurality of available spots. The optimization system may compute probabilities as described in relation to FIG. 7. For example, the optimization system may compute probabilities {0.45, 0.67} for the retrieved available spots {(Channel 8, 5:57 pm), (Channel 11, 2:31 pm)}.

Process 1100 proceeds to block 1106, control circuitry 404 determines a plurality of values, wherein each value in the plurality of values is associated with a probability in the plurality of probabilities. The optimization system may determine a set of values n, wherein each value corresponds to a probability $P_{it}$, as described in relation to FIG. 9.

Process 1100 proceeds to block 1108, when control circuitry 404 identifies a characteristic associated with the user. This may be done as described in relation to blocks 806 and 814. For example, the optimization system may determine that one characteristic of the targeted user is "earns less than $40,000." Although one characteristic is discussed here, it is understood that a targeted user can have any number of characteristics. Process 1100 proceeds to 1110, when control circuitry 404 retrieves, from a demographics database, a weight associated with the characteristic associated with the user. The optimization system may perform this block as discussed in relation to FIG. 8. For example, the optimization system may retrieve the weight 0.3 with the characteristic "earns less than $40,000."

Process 1100 proceeds to block 1112, when control circuitry 404 computes a first reach value associated with the user based on the plurality of probabilities, the plurality of values, and the weight. The optimization system may perform this block as described in relation to FIG. 9. For example, the optimization system may compute a first reach value of 0.60.

Process 1100 proceeds to block 1114, when control circuitry 404 modifies a subset of the plurality of values to create a modified plurality of values. The optimization system may modify the values of n used in block 1112 by selecting a new set of values as described in relation to FIG. 9. In some embodiments, the optimization system may edit a predetermined number of the current set of values instead of selecting a new set of values. Process 1100 proceeds to block 1116, when control circuitry 404 computes a second reach value associated with the user based on the plurality of probabilities, the modified plurality of values from block 1114, and the weight. The optimization system may compute the second reach value as described in relation to FIG. 9. For example, the optimization system may compute that the second reach value is 0.55. The optimization system may compute a first and second reach value to be able to compare them and pick out the optimal reach value for the user. Although only two reach values are discussed here, it is understood that any number of reach values may be computed and compared. For example, several reach values can be computed using the processes described in relation to FIG. 9.

Process 1100 proceeds to block 1118, when control circuitry 404 compares the first reach value and the second reach value to determine that the first reach value is greater than the second reach value. For example, the optimization system may compare the first reach value of 0.60 and the second reach value of 0.55 to determine that the first reach value is greater than the second reach value. In response to this determination, the optimization system may discard the second reach value by removing it from storage or storing it in a different location than the first reach value.

Process 1100 proceeds to block 1120, when control circuitry 404 compares the first reach value to a predetermined reach threshold. The optimization system may use a predetermined reach threshold from storage circuitry 408, such as $R_0$ from block 910, and compare it to the first reach value. Process 1100 proceeds to block 1122, when control circuitry 404, in response to determining that the first reach value is above the predetermined reach threshold at block 1120, transmits the plurality of probabilities, the plurality of available spots, and the plurality of values to a user equipment device. The user equipment device may be any of user television equipment 602, user computer equipment 604, and wireless user communications device 606. The user equipment device may process and sort this data to generate for display information as shown in output screen 1000. In some embodiments, if a value of the plurality of values indicates that a corresponding available spot should not be selected (for example, if a value is 0 for a certain spot), the optimization system may not transmit that spot to the user equipment device.

In some embodiments, if multiple user demographics are being targeted, the optimization system may execute process 1100 twice, once for each targeted user demographic. For example, if the user demographics "male under 8" and "female under 8" are being targeted, the optimization system may execute process 1100 using the user demographic "male under 8" to determine a first reach value and then execute process 1100 using the user demographic "female under 8" to determine a second reach value. The optimization system may then combine the first and second reach values to result in an overall reach value. The two reach values may be combined using any appropriate computation, such as addition, weighted addition, or averaging.

It should be noted that processes 600-900 and 1100, or any step thereof, could be performed on, or provided by, the optimization system on any of the devices shown in FIGS. 4-5. For example, processes 600-900 and 1100 may be executed by processing circuitry 404 (FIG. 4) as instructed by processing circuitry implemented on user equipment 502, 504, and/or 506 (FIG. 5) in order to provide information to a user. In addition, one or more steps of processes 600-900 and 1100 may be incorporated into or combined with one or more steps of any other process or embodiment.

It is contemplated that the steps or descriptions of FIGS. 1-11 may be used with any other embodiment of this disclosure. In addition, the steps and descriptions described in relation to FIGS. 1-11 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for performing non-linear reach optimization for reach values that indicate how many unique people an ad or media asset reached, the method comprising:
    retrieving, using a control circuitry, from a media content database, a plurality of available spots;
    computing, using the control circuitry, a plurality of probabilities associated with a first user, wherein each probability of the plurality of probabilities is associated with one of the plurality of available spots;
    determining, using the control circuitry, a plurality of values, wherein each value in the plurality of values is associated with a probability in the plurality of probabilities;
    identifying, using the control circuitry, a characteristic associated with the first user;
    retrieving, using the control circuitry, from a demographics database, a weight associated with the characteristic associated with the first user;
    computing, using the control circuitry, a first reach value associated with the first user based on the plurality of probabilities, the plurality of values, and the weight;
    modifying, using the control circuitry, a subset of the plurality of values to create a modified plurality of values;
    computing, using the control circuitry, a second reach value associated with the first user based on the plurality of probabilities, the modified plurality of values, and the weight;
    computing, using the control circuitry, a third reach value associated with a second user;
    adding, using the control circuitry, the first reach value and the third reach value to obtain a modified first reach value;
    adding, using the control circuitry, the second reach value and the third reach value to obtain a modified second reach value;
    comparing, using the control circuitry, the modified first reach value and the modified second reach value to determine that the modified first reach value is greater than the modified second reach value;
    comparing, using the control circuitry, the modified first reach value to a predetermined reach threshold; and
    in response to determining the modified first reach value is above the predetermined reach threshold, transmitting, using a control circuitry, the plurality of probabilities, the plurality of available spots, and the plurality of values to a user equipment device.

2. The method of claim 1, wherein the weight is a ratio of a number of users in the demographics database associated with the characteristic and a total number of users in the demographics database.

3. The method of claim 1, wherein computing the modified first reach value comprises computing a probability of the plurality of probabilities to the power of a value of the plurality of values.

4. The method of claim 1, further comprising receiving a user input identifying a network, a time, or a demographic associated with the plurality of available spots.

5. The method of claim 1, further comprising receiving a user input identifying a targeted demographic, and retrieving the weight based on the targeted demographic.

6. The method of claim 1, wherein computing the plurality of probabilities comprises using historical averages, collaborative filtering, or predictive machine learning algorithms.

7. The method of claim 1, further comprising:
    receiving a user input of a rule to be satisfied;
    determining the third reach value does not satisfy the rule; and
    discarding the third reach value.

8. The method of claim 1, wherein determining the plurality of values comprises randomly determining the plurality of values.

9. The method of claim 1, further comprising storing, in a trials database, the modified first reach value, the plurality of values, the modified second reach value, and the modified plurality of values.

10. A system for performing non-linear reach optimization for reach values that indicate how many unique people an ad or media asset reached, the system comprising:
- a media content database storing a plurality of available spots;
- a demographics database storing a plurality of weights associated with a plurality of characteristics; and
- control circuitry configured to:
- retrieve, from the media content database, the plurality of available spots;
- compute a plurality of probabilities associated with a first user, wherein each probability of the plurality of probabilities is associated with one of the plurality of available spots;
- determine a plurality of values, wherein each value in the plurality of values is associated with a probability in the plurality of probabilities;
- identify a characteristic associated with the first user;
- retrieve, from the demographics database, a weight associated with the characteristic associated with the first user;
- compute a first reach value associated with the first user based on the plurality of probabilities, the plurality of values, and the weight;
- modify a subset of the plurality of values to create a modified plurality of values;
- compute a second reach value associated with the first user based on the plurality of probabilities, the modified plurality of values, and the weight;
- compute, using the control circuitry, a third reach value associated with a second user;
- add, using the control circuitry, the first reach value and the third reach value to obtain a modified first reach value;
- add, using the control circuitry, the second reach value and the third reach value to obtain a modified second reach value;
- compare the modified first reach value and the modified second reach value to determine that the modified first reach value is greater than the modified second reach value;
- compare the modified first reach value to a predetermined reach threshold; and
- in response to determining the modified first reach value is above the predetermined reach threshold, transmit the plurality of probabilities, the plurality of available spots, and the plurality of values to a user equipment device.

11. The system of claim 10, wherein the weight is a ratio of a number of users in the demographics database associated with the characteristic and a total number of users in the demographics database.

12. The system of claim 10, wherein the control circuitry is configured to compute the modified first reach value by computing a probability of the plurality of probabilities to the power of a value of the plurality of values.

13. The system of claim 10, wherein the control circuitry is further configured to receive a user input identifying a network, a time, or a demographic associated with the plurality of available spots.

14. The system of claim 10, wherein the control circuitry is further configured to receive a user input identifying a targeted demographic, and retrieve the weight based on the targeted demographic.

15. The system of claim 10, wherein the control circuitry is configured to compute the plurality of probabilities by using historical averages, collaborative filtering, or predictive machine learning algorithms.

16. The system of claim 10, wherein the control circuitry is further configured to:
- receive a user input of a rule to be satisfied;
- determine the third reach value does not satisfy the rule; and
- discard the third reach value.

17. The system of claim 10, wherein the control circuitry is configured to determine the plurality of values by randomly determining the plurality of values.

18. The system of claim 10, wherein the control circuitry is further configured to store, in a trials database, the modified first reach value, the plurality of values, the modified second reach value, and the modified plurality of values.

* * * * *